(12) United States Patent  
Carletti et al.

(10) Patent No.: US 8,555,433 B2  
(45) Date of Patent: Oct. 15, 2013

(54) DEVICES FOR THE ASSISTED LOADING OF A STRETCHER

(75) Inventors: Enrico Carletti, Pieve di cento (IT); Alessandro Lapini, San Casciano V.P. (IT)

(73) Assignee: Ferno-Washington, Inc., Wilmington, OH (US)

( * ) Notice: Subject to any disclaimer, the term of this patent is extended or adjusted under 35 U.S.C. 154(b) by 100 days.

(21) Appl. No.: 13/343,182

(22) Filed: Jan. 4, 2012

(65) Prior Publication Data

US 2012/0199405 A1 Aug. 9, 2012

Related U.S. Application Data

(63) Continuation-in-part of application No. 12/096,657, filed as application No. PCT/IB2006/003633 on Dec. 15, 2006, now Pat. No. 8,096,005.

(30) Foreign Application Priority Data

Dec. 16, 2005 (IT) .............................. BO2005A0770

(51) Int. Cl.
*A61G 7/10* (2006.01)

(52) U.S. Cl.
USPC .................................. 5/86.1; 5/611; 180/65.1

(58) Field of Classification Search
USPC .......... 180/65.1, 6.5, 11, 19.1, 19.3; 280/638, 280/640; 296/20; 5/86.1, 600, 611
See application file for complete search history.

(56) References Cited

U.S. PATENT DOCUMENTS

| | | | | |
|---|---|---|---|---|
| 3,808,899 | A * | 5/1974 | Cooper | 476/16 |
| 3,826,528 | A * | 7/1974 | East | 296/20 |
| 4,921,295 | A * | 5/1990 | Stollenwerk | 296/20 |
| 5,015,024 | A * | 5/1991 | Bloemer | 296/20 |
| 5,987,671 | A * | 11/1999 | Heimbrock et al. | 5/600 |
| 6,019,682 | A * | 2/2000 | Arabo | 463/52 |
| 6,070,899 | A * | 6/2000 | Gines | 280/651 |
| 6,203,085 | B1 * | 3/2001 | Ferris | 296/20 |
| 6,286,165 | B1 * | 9/2001 | Heimbrock et al. | 5/600 |
| 6,330,926 | B1 * | 12/2001 | Heimbrock et al. | 180/65.51 |
| 6,332,638 | B1 * | 12/2001 | Menna | 296/20 |
| 6,735,794 | B1 * | 5/2004 | Way et al. | 5/86.1 |
| 7,011,172 | B2 * | 3/2006 | Heimbrock et al. | 180/65.51 |
| 7,021,407 | B2 * | 4/2006 | Ruschke et al. | 180/11 |

(Continued)

FOREIGN PATENT DOCUMENTS

GB 2400805 A 10/2004
JP 62117557 5/1987

(Continued)

OTHER PUBLICATIONS

Office Action in Canadian patent application No. 2,632,445.

(Continued)

*Primary Examiner* — Katy M Ebner
*Assistant Examiner* — Brodie Follman
(74) *Attorney, Agent, or Firm* — Dinsmore & Shohl LLP

(57) ABSTRACT

A device for the assisted loading of a stretcher (2) provided with a chassis (3), comprises at least one driving wheel (4) circumferentially connected to a driving member (5) fed by connectivity member (6) and controlled by controller (7) to activate the at least one driving wheel (4) at least during the loading of the stretcher into the ambulance.

18 Claims, 8 Drawing Sheets

(56) References Cited

U.S. PATENT DOCUMENTS

| | | | |
|---|---|---|---|
| 7,191,854 B2* | 3/2007 | Lenkman | 180/65.1 |
| 7,284,626 B2* | 10/2007 | Heimbrock et al. | 180/65.1 |
| 7,637,550 B2* | 12/2009 | Menna | 296/20 |
| 7,856,685 B2* | 12/2010 | Matunaga et al. | 5/611 |
| 7,922,183 B2* | 4/2011 | Figel et al. | 280/47.38 |
| 8,096,005 B2* | 1/2012 | Carletti et al. | 5/86.1 |
| 8,444,195 B2* | 5/2013 | Bourgraf et al. | 296/20 |
| 2003/0192725 A1* | 10/2003 | Heimbrock et al. | 180/65.1 |
| 2004/0088792 A1* | 5/2004 | O'Krangley et al. | 5/611 |
| 2005/0072610 A1 | 4/2005 | Heimbrock et al. | |
| 2005/0126835 A1* | 6/2005 | Lenkman | 180/65.1 |
| 2006/0075558 A1* | 4/2006 | Lambarth et al. | 5/611 |
| 2006/0082176 A1* | 4/2006 | Broadley et al. | 296/20 |
| 2006/0123545 A1* | 6/2006 | Johnson | 5/611 |
| 2006/0207027 A1* | 9/2006 | Matunaga et al. | 5/611 |
| 2006/0225203 A1* | 10/2006 | Hosoya et al. | 5/86.1 |
| 2007/0034424 A1* | 2/2007 | Snowden et al. | 180/65.1 |
| 2009/0000834 A1* | 1/2009 | Carletti et al. | 180/65.1 |
| 2009/0015027 A1* | 1/2009 | Lambarth et al. | 296/20 |
| 2009/0051184 A1* | 2/2009 | Saleem | 296/20 |
| 2009/0276959 A1* | 11/2009 | Menna | 5/611 |
| 2010/0175933 A1* | 7/2010 | Yoshida | 180/65.1 |
| 2010/0293712 A1* | 11/2010 | Pizzi Spadoni | 5/86.1 |
| 2011/0018296 A1* | 1/2011 | Broadley et al. | 296/20 |
| 2011/0080016 A1* | 4/2011 | Lambarth et al. | 296/20 |
| 2011/0168464 A1* | 7/2011 | Scheuerman et al. | 180/65.51 |
| 2012/0199405 A1* | 8/2012 | Carletti et al. | 180/65.1 |
| 2012/0237326 A1* | 9/2012 | Van Ness | 414/507 |

FOREIGN PATENT DOCUMENTS

| | | |
|---|---|---|
| JP | 6285115 | 4/1994 |
| JP | 7033011 | 2/1995 |
| JP | 2002153512 | 5/2002 |
| JP | 2003509123 | 3/2003 |

OTHER PUBLICATIONS

Japanese Office Action Mailed Dec. 27, 2011 pertaining to Application Serial No. 2008-545139.

* cited by examiner ations.

DEVICES FOR THE ASSISTED LOADING OF A STRETCHER

CROSS-REFERENCE TO RELATED APPLICATIONS

The present application is a continuation-in-part of U.S. patent application Ser. No. 12/096,657, which was entered into U.S. National Stage on Jun. 9, 2008 based on PCT No. PCT/IB2006/003633 filed Dec. 15, 2006, which claims priority to Italian Patent Application Serial No. B02005A000770 filed Dec. 16, 2005.

TECHNICAL FIELD

The present disclosure relates to the technical field of the medical devices used for transporting patients and it refers to a device for the assisted loading of a stretcher particularly suitable to facilitate the insertion and the loading of the stretcher in an ambulance or the like.

BACKGROUND ART

There are known ambulance stretchers equipped with pivoting legs that fold in a direction generally parallel to the stretcher positioned inside of the ambulance and that, when the stretcher exits the ambulance, the pivoting legs rotate about 90° into a generally vertical position to support the patient-support portion of the stretcher in a generally horizontal position.

In general, each leg has a wheel positioned at the end of the leg to ease the movement of the stretcher out of the ambulance.

When a patient is positioned on the stretcher, and the stretcher is loaded into the ambulance, the legs of the stretcher contact a component of the ambulance, which initiates folding of the legs.

A drawback of said known stretchers is that when loading the stretcher with a patient positioned on the stretcher into the ambulance, the operators need to use considerable effort to provide the necessary energy to load the heavy stretcher and to fold the legs.

Other drawbacks include that the impact between the legs and the component of the ambulance can be violent and thus irritating, painful and harmful for the patient, in particular for a traumatized patient.

SUMMARY

In one example, a device for the assisted loading of a stretcher, that reduces the effort of the operator when loading and/or unloading the stretcher with the patient from the ambulance is shown and described herein.

In another example, a device that allows reduction of the impact between the legs of the stretcher and the ambulance in order to increase the comfort and the safety for the patient is shown and described herein.

BRIEF DESCRIPTION OF THE DRAWINGS

The characteristics of the disclosure are evidenced in the following with particular reference to the attached drawings, in which.

DETAILED DESCRIPTION

Figure 1:
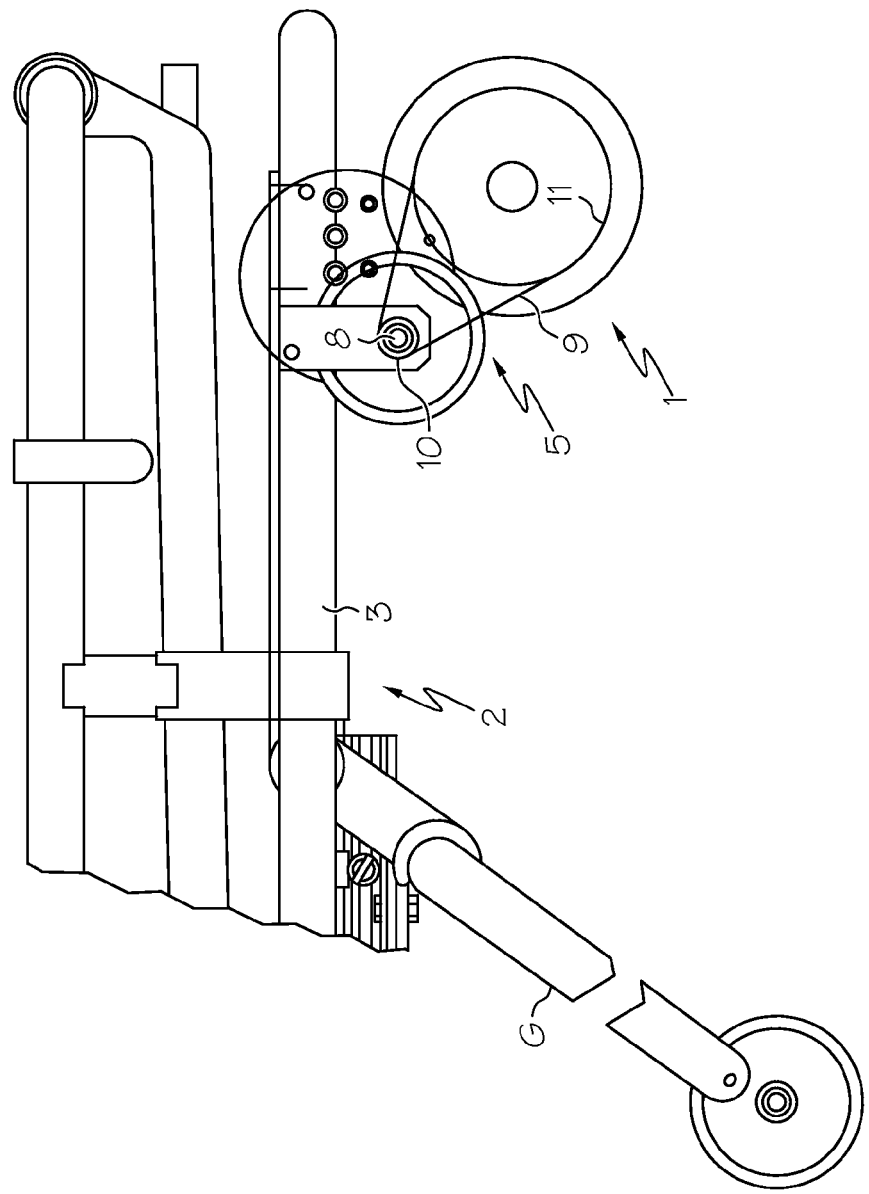
FIG. 1 shows a schematic partial side view of the device for the assisted loading of a stretcher in which some parts are removed to better evidence other parts.
Figure 3:
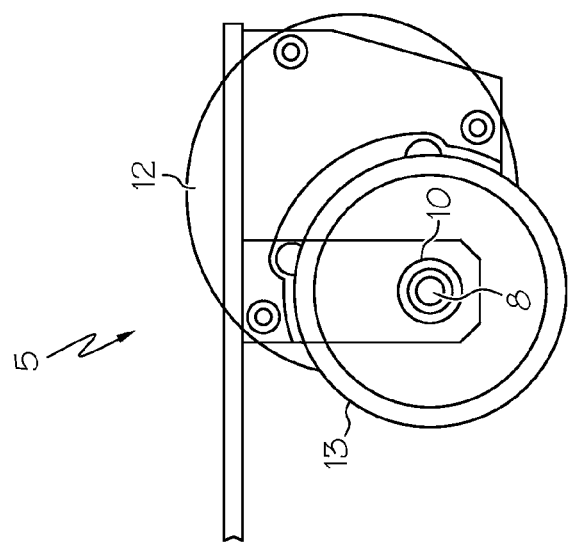
FIG. 3 shows a side view of the driving member of FIG. 1.
Figure 2:
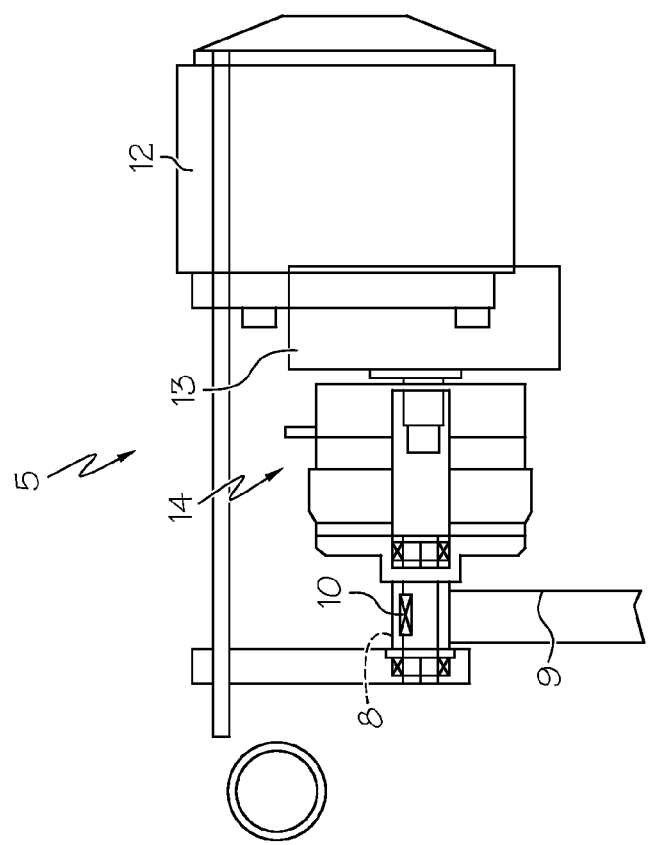
FIG. 2 shows a front view of a driving member of FIG. 1.

With reference to the FIGS. 1-5, numeral 1 indicates the device for the assisted loading of a stretcher 2, for example a stretcher 2 typically used with ambulances, provided with a chassis 3 and pivoting legs G for the idle wheels fit for moving the stretcher.

The device 1 comprises a pair of lateral driving wheels 4 positioned in the front lower portion of the chassis 3, in front of the front pivoting legs G. The lateral driving wheels 4 engage the loading ramp of the ambulance during the loading and unloading phases of the stretcher 2.

Said driving wheels 4 are connected to a transmission axle 17. A pulley 11 is coupled to the transmission axle 17 and is connected to a pulley 10 coupled to an outlet shaft 8 of the driving member 5 by a timing belt 9. Thus, the outlet shaft 8 of the driving member 5 is coupled to the driving wheels 4.

Said driving member 5 is selected to rotate by a connectivity member 6 electrically connected to a controller 7. An operator selects the controller 7, which initiates the connectivity member 6 to activate the driving member 5, thereby rotating the driving wheels 4 when the stretcher 2 is loaded into and out of the ambulance.

In alternative embodiments, the device 1 is provided with a single driving wheel 4. In another embodiment, the connection of said driving wheel 4 to the outlet shaft 8 of the driving member 5 is made by a chain, a trapezoidal belt, a gear box or angle transmission connected by a shaft, or similar transmissions.

In some embodiments, the driving member 5 is connected to the front lower portion of the chassis 3 and comprises a motor 12, a reduction gear 13 and a clutch 14 connected to one another.

The motor 12 is an electrical type fed by an energy storage device, for example a rechargeable battery. The controller 7 is an electrical type and is selected to operate when an operator activates a control switch 7a.

In some embodiments, the motor 12 is a direct current type and the control switch of the controller 7 includes operation positions corresponding with forward and reverse motion of the motor 12, as well as a stopped condition of the motor 12. In other embodiments, the control switch of the controller 7 is a potentiometer-type that includes a variety of control positions for adjusting the speed of the forward and reverse motion of the motor 12, as well as the stopped condition.

The clutch 14 may include an electromagnetic clutch controlled by the controller 7. In an alternative, the clutch 14 may include a hydraulically operated clutch.

In some embodiments, the clutch (14) may include a manual or electric operated transmission gear having at least one transmission condition and a neutral condition.

The outlet shaft 8 of the clutch 14 is connected to the pulley 10 and the outlet shaft 8 may be positioned transversally to a length of the stretcher 2, generally parallel to the shafts of motor 12 and of the reduction gear 13.

Figure 7:
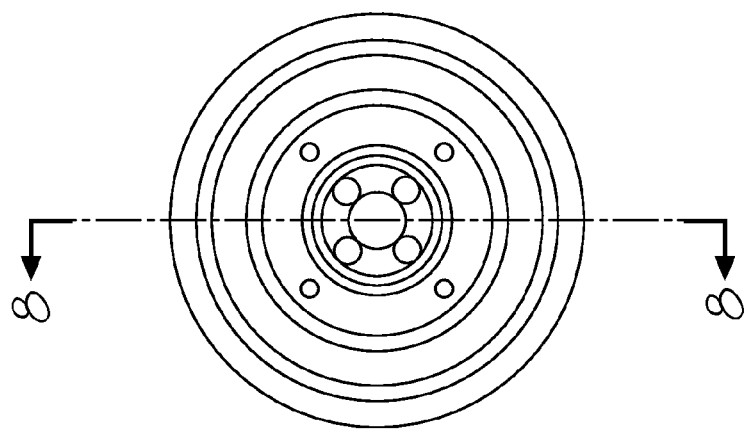
FIG. 7 shows a side view of components of the stretcher including a mechanical clutch.
Figure 6:
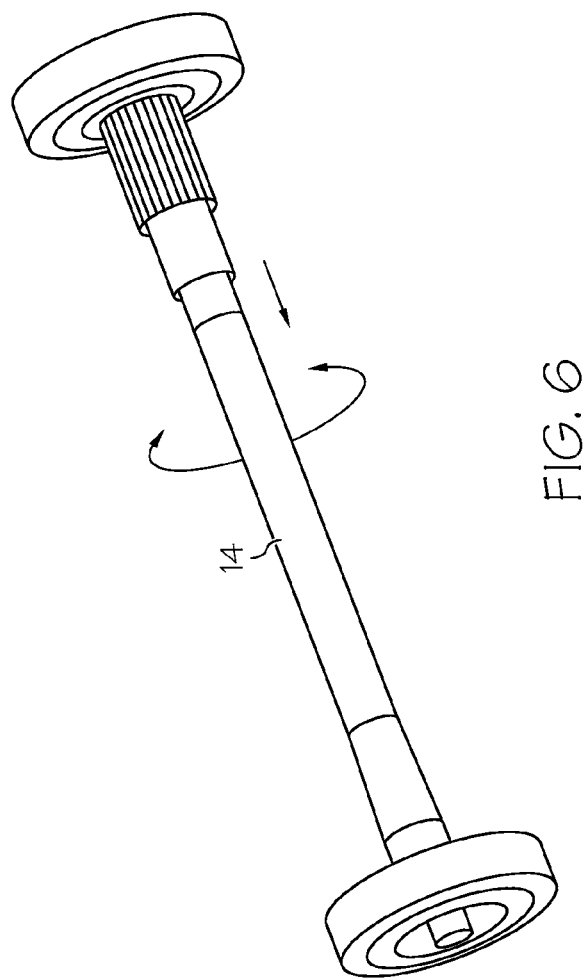
FIG. 6 shows a perspective view of components of the stretcher including a mechanical clutch.
Figure 8:
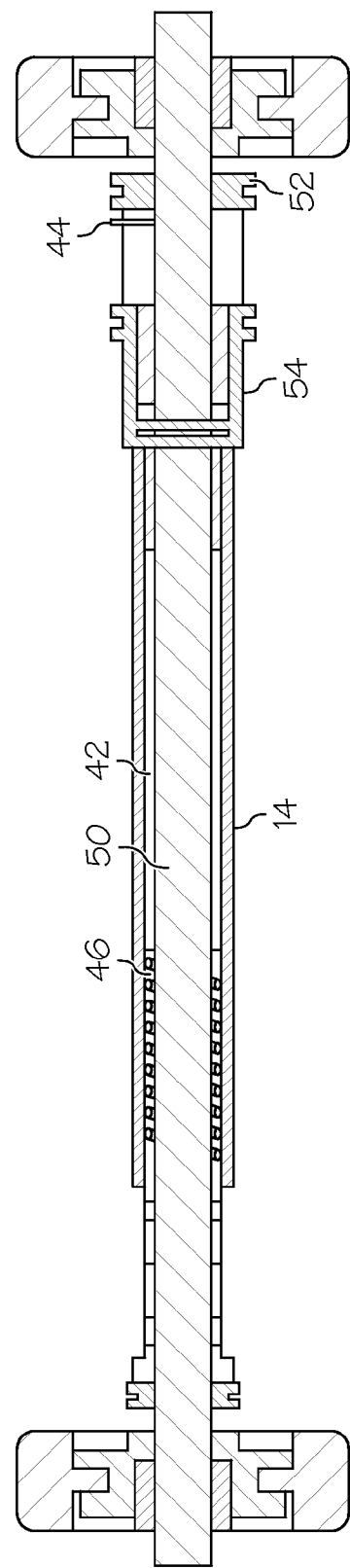
FIG. 8 shows a front cross-section view along line A-A of FIG. 7 of components of the stretcher including a mechanical clutch.

Referring to FIGS. 6-8, a clutch 14 that comprises a mechanical clutch is depicted. In this embodiment, the clutch 14 includes an outer sleeve 42 having a coupling 44 that mates with a coupling 52 on an inner shaft 50. A biasing spring 46 is positioned between the outer sleeve 42 and the inner shaft 50 and applies a force that tends to press the coupling 44 of the outer sleeve 42 onto the coupling 52 of the inner shaft 50, engaging the outer sleeve 42 with the inner shaft 50. Without intervention from an operator, the clutch 14 is engaged. To disengage the clutch 14, an operator applies a force to the outer sleeve 42 that tends to compress the biasing spring 46, allowing the outer sleeve 42 to translate along the inner shaft 50 and separate the coupling 44 of the outer sleeve 42 from the coupling 52 of the inner shaft 50. With the clutch 14 disengaged, the driving wheels 4 are free to rotate from the driving member 5. The outer sleeve 42 and/or the inner shaft 50 may include a ramp 54 that allows an operator to twist the outer sleeve 42 relative to the inner shaft 50 to compress the biasing spring 46, which allows the coupling 44 of the outer sleeve 42 to separate from the coupling 52 of the inner shaft 50.

In an alternative, the driving member 5 may include a motor 12 with the reduction gear 13, where the motor 12 has a high torque even at very low revolutions speed and the clutch 14 includes a manual or an automatic clutch or a speed change device. In one embodiment, the clutch 14 is a centrifugal-type clutch that couples the driving wheels 4 to the driving member 5 when a pre-determined rotational speed of the driving wheels 4 and/or the driving member 5 is reached.

The driving wheels 4 may include a free wheel 15, for example of so-called "ratchet and pawl" type, connecting to the transmission axle 17. The free wheel 15 allows the operator to apply force to the stretcher 2 when loading of the stretcher 2 into the ambulance, after the initial ramp tract, pushing the stretcher 2 at a higher speed than the ingress speed provided by the device 1.

The driving wheels 4 are provided with a circumferential friction interface 16, for example consisting of a rubber ring, fit to prevent the slipping on the ramp of the ambulance.

Figure 4:
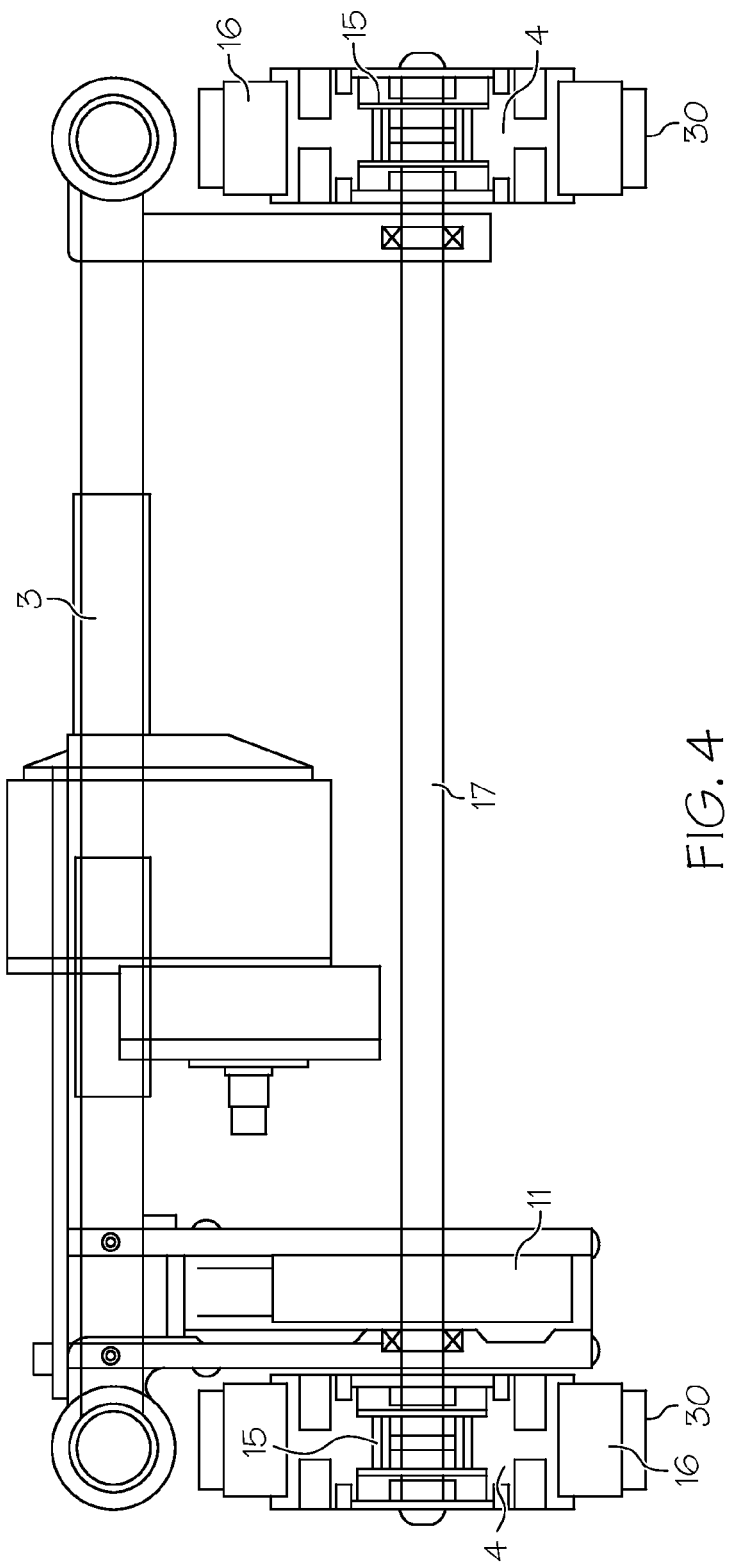
FIG. 4 shows a front view of the device and of the stretcher of FIG. 1 in which some parts are removed to better evidence others parts.
Figure 5:
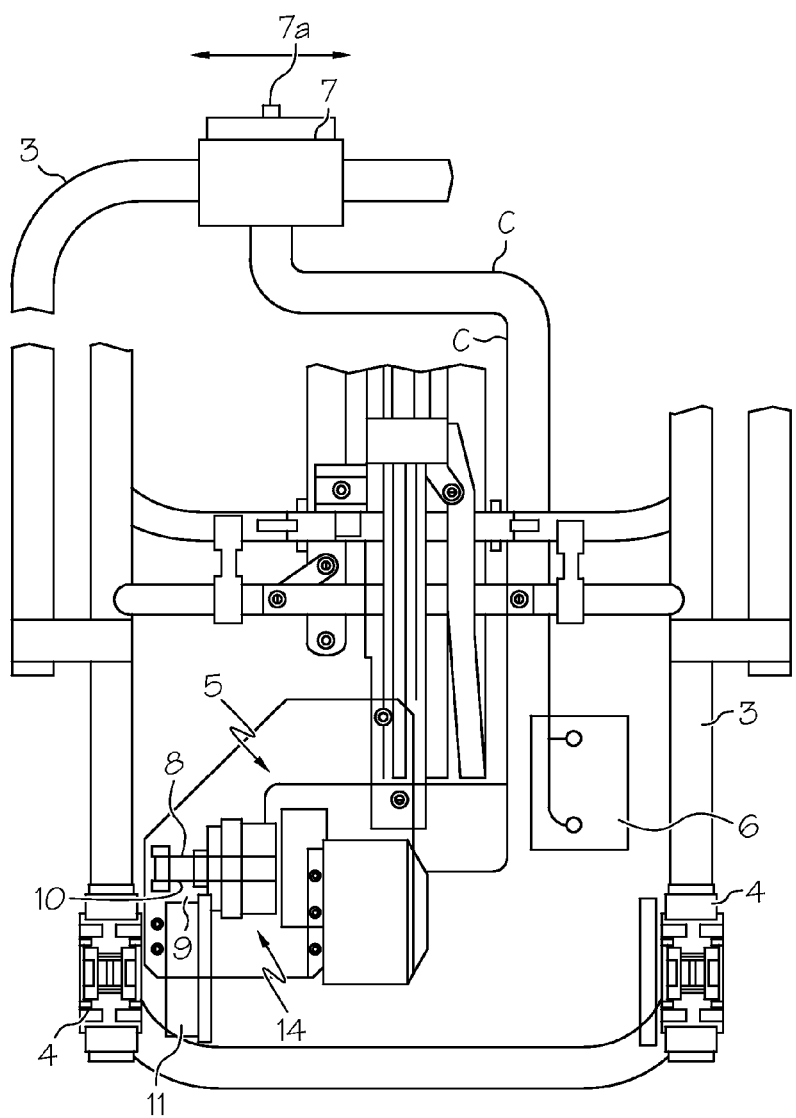
FIG. 5 shows a top view of the device and of the stretcher of FIG. 1 in which some parts are removed to better evidence other parts.

In an alternative, the disclosure provides the adoption of a small caterpillar track 30, as depicted in FIG. 4, which may be made from a variety of materials including, for example, being made of reinforced rubber or metal made with rubber inserts, each being engaged and tensioned between an idle wheel and a driving wheel 4.

Figure 9:
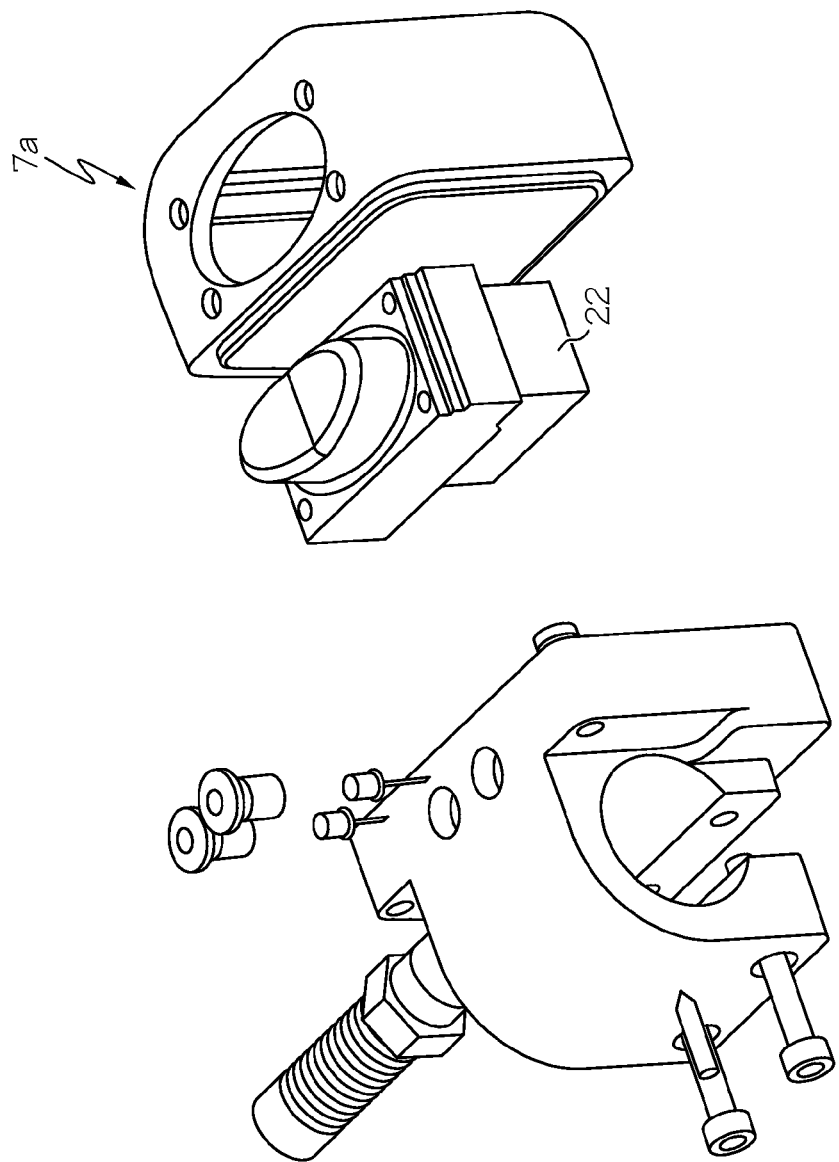
FIG. 9 shows an exploded schematic view of a control switch having a potentiometer.

The control switch 7a is positioned in the rear portion of the stretcher for an easy operation by the operator. Referring now to FIG. 9, the control switch 7a may include a rocker switch having a potentiometer 22. The potentiometer 22 controls forward and reverse rotation of the motor 12. The potentiometer 22 also provides speed control of the motor 12. In one embodiment, the rotational speed of the motor 12 is proportional to the movement of the potentiometer 22, such that the further an operator depresses the rocker switch, the greater the rotational speed of the motor 12, and the greater the speed of translation of the stretcher 2.

The connectivity member 6 and the connecting wirings C of these latter with the controller 7 and with the driving member 5 are fixed to the chassis 3.

Figure 10:
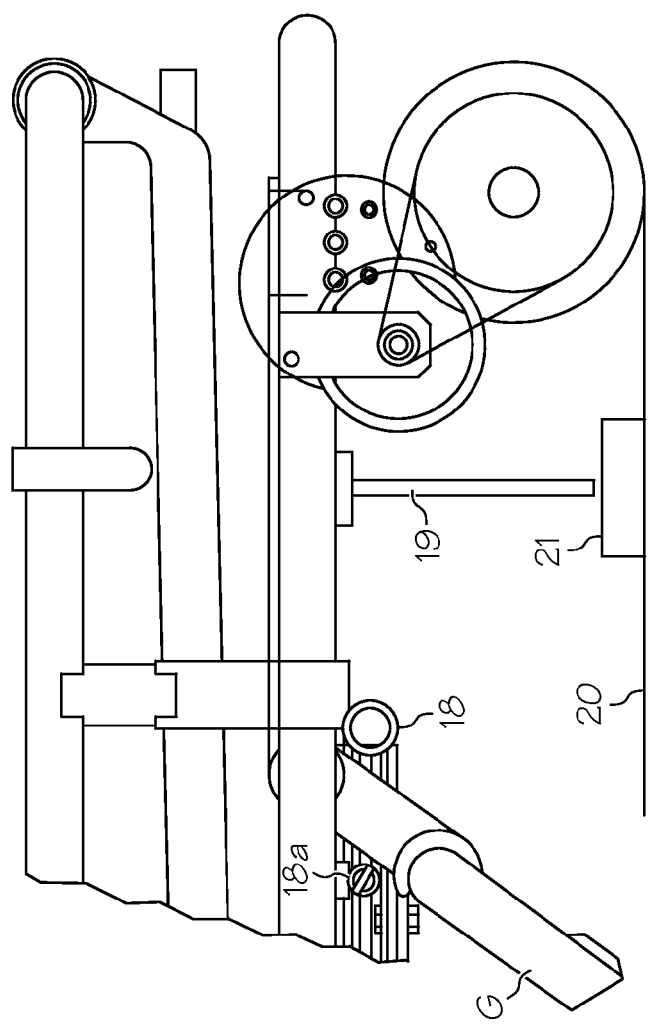
FIG. 10 shows a schematic partial side view of the stretcher including sensors.

Referring now to FIG. 10, optionally the device could comprise at least first sensor 18 and second sensor 19 respectively fit for detecting a condition of stop in a vertical operating position of the front legs G of the stretcher 2 and a position of the stretcher 2 close to the external edge of the loading ramp 20 in the unloading phase of the stretcher 2. The first sensor 18 may be a mechanical, optical, magnetic, electromagnetic, or inductive sensor, a contact electric switch, or an electric terminal that detects the vertical operating position of the front pivoting legs G of the stretcher 2. The first sensor 18 may also include a detector 18a that detects a safety lock of a respective one of the front pivoting legs G of the stretcher 2. By sensing the position of the safety lock, the detector 18a confirms that the front pivoting legs G of the stretcher 2 are locked into the vertical operating position. The second sensor 19 may be a mechanical, optical, magnetic, electromagnetic, or inductive sensor, a contact electric switch, or an electric terminal that detects the position of the front portion of the stretcher 2 relative to the edge of the loading ramp 20. The second sensor 19 may detect a mechanical or electronic referencing device 21 fixed to the loading ramp 20. The referencing device 21 may include a magnet, a reference line on contrasting background, a mirror, a optical bar code, or a radio-frequency identification device (RFID tag).

The first sensor 18 and second sensor 19 are electrically linked to the controller 7 to stop the driving member 5 and the at least one driving wheel 4 when the stretcher 2 is exiting out of the ambulance and at least one of the front legs G is not stopped in vertical operating position. For example, the first sensor 18 may provide a signal to the controller 7 when the first sensor 18 determines that the front pivoting legs G of the stretcher 2 are positioned in a vertical operating position. Alternatively, or in addition, the first sensor 18 may provide a signal to the controller 7 when the first sensor 18 determines that the front pivoting legs G of the stretcher are positioned away from the vertical operating position. In one embodiment in which the first sensor 18 is an electromagnetic proximity probe, the first sensor 18 emits a beam of electromagnetic radiation and evaluates changes in the signal as it returns to the proximity probe. When the front pivoting legs G of the stretcher 2 are positioned in the vertical operating position, the electromagnetic proximity probe provides a signal to the controller 7 that can be correlated to the distance between the front pivoting legs G of the stretcher 2 and the electromagnetic proximity probe. With the front pivoting legs G positioned in the vertical operating position, the controller 7 disables the driving member 5 from being energized as to prevent a driving torque from being applied that overdrives the stretcher 2 from the ambulance.

In another embodiment, the first sensor 18 may be an electrical switch that is positioned such that when the front pivoting legs G are positioned in the vertical operating position, the electrical switch is mechanically actuated, thereby actuating an electrical contact. In one embodiment, the electrical switch closes a circuit with the controller 7 when the front pivoting legs G are positioned away from the vertical operating position, and opens the circuit with the controller 7 when the front pivoting legs G are positioned in the vertical operating position. When the circuit between the electrical switch of the first sensor 18 and the controller 7 is closed (i.e., when the front pivoting legs G are away from the vertical operating position), the driving member 5 may be energized to provide a driving torque so that an operator can load and/or unload the stretcher 2 into or from an ambulance.

The first sensor 18 can be implemented as a safety provision to avoid the risk that the stretcher 2 can come out from the ambulance without the correct positioning and blocking of the legs G. The first sensor 18, therefore, reduces the likelihood that the forward portion of the stretcher 2 would fall from the ambulance when the stretcher 2 is being unloaded from the ambulance.

In one embodiment, the first sensor 18 may include at least two switches or detectors each connected to a safety lock of a respective front leg G.

The second sensor 19 may include at least two switches or detectors, for example a metallic protrusion may be attached to the ambulance near the edge of the loading ramp 20, and an induction sensor may be attached to the stretcher 2. The induction sensor can measure the proximity of the sensor to the metallic protrusion fixed to the ambulance. As the stretcher 2 is being unloaded from the ambulance, the induction sensor approaches the metallic protrusion of the second sensor 19. When the distance between the induction sensor and the metallic protrusion reaches a pre-determined minimum distance (corresponding to a maximum distance the stretcher 2 is to be moved by the driving member 5 out of the ambulance), the second sensor 19 provides a signal to the controller 7 to de-energize or otherwise disable the driving member 5 to prevent the driving member 5 from applying a driving torque that drives the stretcher 2 out of the ambulance.

The operation of the device 1 provides, for example, that the operator pushes the stretcher 2 with the patient until the driving wheels 4 are positioned proximate to the short ramp of the ambulance. With the stretcher 2 so positioned, the operator actuates the controller 7 as to activate the driving member 5, which provides controlled rotation of the driving wheels 4 and drives the stretcher 2 into the ambulance.

The first and second sensors 18, 19 may be selectively bypassed by the controller 7 such that the controller 7 allows operation of the driving member 5 when the stretcher 2 is being loaded into the ambulance, but not be bypassed when the stretcher 2 is being unloaded from the ambulance. In one embodiment, the first and second sensors 18, 19 may be wired into a series circuit with the controller 7, the driving member 5, and the position of the switch corresponding to the unloading direction of the stretcher 2 from the ambulance. When the first sensor 18 detects that the front pivoting legs G are in the vertical operating position, the first sensor 18 electrically opens the circuit and interrupts operation of the driving member 5. Similarly, when the second sensor 19 detects that the stretcher 2 is approaching the external edge of the loading ramp 20 of the ambulance, the second sensor opens, opening the circuit and interrupting operation of the driving member 5. Additionally, if the operator changes the position of the switch to correspond to the loading direction of the stretcher 2 into the ambulance, the first and second sensors 19 are bypassed from interacting with the controller 7 and the driving member 5.

The controller 7 may include embedded control logic that controls whether an operator is able to select use of the driving member 5 when loading or unloading the stretcher 2 from an ambulance. In an embodiment such as this, the first sensor 18 transmits signals to the controller 7 that correspond to the position of the front pivoting legs G, as described above. The first sensor 18 transmits a first signal to the controller 7 when the front pivoting legs G are confirmed to be stopped in the vertical operating position, and transmits a second signal to the controller 7 when the front pivoting legs G are not stopped in the vertical operating position. The controller 7 interprets the signal based on the embedded control logic to allow the driving member 5 to be operated to assist with removing the stretcher 2 from the ambulance when the front pivoting legs G are not stopped in the vertical operating position and to disable the driving member 5 from being operated when the front pivoting legs G are stopped in the vertical operating position.

Similarly, the second sensor 19 transmits signals to the controller 7 that correspond to the position of the stretcher 2 relative to the external edge of the loading ramp 20. The second sensor 19 transmits a first signal to the controller 7 when the stretcher 2 is close to the edge of the loading ramp 20, and transmits a second signal when the stretcher 2 is not close to the edge of the loading ramp 20. The controller 7 interprets the signal based on the embedded control logic to allow the driving member 5 to be operated to assist with removing the stretcher 2 from the ambulance when the stretcher 2 is not near the external edge of the loading ramp 20, and to disable the driving member from being operated when the stretcher 2 is near the external edge of the loading ramp 20.

In some illustrative embodiments, the device 1 does not require any modification of the ambulances and it can be easily applied also to the stretchers existing before of the known type.

An advantage of the present disclosure is to provide a device 1 for the assisted loading of a stretcher 2 which can let the operator to reduce or to avoid the effort when loading and/or unloading the stretcher 2 with the patient.

Another advantage is to provide a device which can reduce the impact between the legs of the stretcher and the ambulance in order to increase the comfort and the safety for the patient.

The invention claimed is:

1. A device for assisting loading onto a loading ramp of an ambulance a stretcher provided with a chassis and front pivoting legs pivotally attached to the chassis, said front pivoting legs having idle wheels fit for moving the stretcher, said device comprises:
    at least one driving wheel fixed in a front lower portion of the chassis, in front of the front pivoting legs remote from said idle wheels, in order to engage the loading ramp of the ambulance during loading and unloading of the stretcher; said at least one driving wheel is operably connected to a driving member which is electrically powered and controlled to activate the at least one driving wheel at least during the loading of the stretcher into the ambulance,
    a transmission axle to which is fixed a pulley which is connected to the driving member and further connected to the transmission axle are two lateral wheels, at least one of which is the driving wheel, wherein the at least one driving wheel engages a further provided idle wheel via a caterpillar track, and wherein the two lateral wheels are each configured to free wheel at a higher speed than that provided by the driving member; and
    at least one sensor coupled to the chassis for detecting an operating position of the stretcher during an unloading phase out of the ambulance.

2. A device for assisting loading onto a loading ramp of an ambulance a stretcher provided with a chassis and front pivoting legs pivotally attached to the chassis, said front pivoting legs having idle wheels fit for moving the stretcher, said device comprises:
    at least one driving wheel fixed in a front lower portion of the chassis, in front of the front pivoting legs remote from said idle wheels, in order to engage the loading ramp of the ambulance during loading and unloading of the stretcher; said at least one driving wheel is operably connected to a driving member which is electrically powered and controlled to activate the at least one driving wheel at least during the loading of the stretcher into the ambulance, a transmission axle to which is fixed a pulley which is connected to the driving member and further connected to the transmission axle are two lateral wheels, at least one of which is the driving wheel, wherein the two lateral wheels are each configured to free wheel at a higher speed than that provided by the driving member; and at least one sensor coupled to the chassis for detecting an operating position of the stretcher during an unloading phase out of the ambulance.

3. The device according to claim 2, wherein the at least one sensor comprises a first sensor fitted to detect a condition of stop in a vertical operating position of the front pivoting legs of the stretcher, said first sensor being linked to a control configured to stop the driving member and the at least one driving wheel when the stretcher is exiting out of the ambulance and at least one of the front pivoting legs is not stopped in the vertical operating position.

4. The device according to claim 3, wherein the first sensor comprises at least two sensors, switches, or detectors configured to detect a position of a safety lock of a respective one of the front pivoting legs.

5. The device according to claim 2, wherein the at least one sensor comprises a second sensor fitted to detect a position of the stretcher close to an external edge of the loading ramp in an exiting condition of the stretcher, said second sensor being linked to a control configured to stop the driving member and the at least one driving wheel when the stretcher is exiting out of the ambulance.

6. The device according to claim 5, wherein the second sensor comprises at least two sensors, switches, or detectors fixed to the ambulance, fit to match, one after another, a matching indicator of the stretcher to detect the exiting condition of the stretcher and the positioning of a front portion of the stretcher close to the external edge of the loading ramp.

7. The device according to claim 2, wherein the at least one sensor comprises an electromagnetic sensor that detects the operating position of the stretcher during the unloading phase out of the ambulance.

8. The device according to claim 2, wherein the at least one sensor comprises an optical sensor that detects the operating position of the stretcher during the unloading phase out of the ambulance.

9. The device according to claim 2, wherein the at least one sensor comprises a magnetic sensor that detects the operating position of the stretcher during the unloading phase out of the ambulance.

10. The device according to claim 2, wherein the at least one sensor comprises an inductive sensor that detects the operating position of the stretcher during the unloading phase out of the ambulance.

11. The device according to claim 2, wherein the at least one sensor comprises a contact electric switch that detects the operating position of the stretcher during the unloading phase out of the ambulance.

12. The device according to claim 2 further comprising a controller electrically coupled to the driving member and to the at least one sensor.

13. The device according to claim 12, wherein the controller activates the driving member based on a control logic and a signal provided by the at least one sensor.

14. The device according to claim 13, wherein when the front pivoting legs are in a condition of stop in a vertical operating position, the at least one sensor provides a first signal to the controller, and when the front pivoting legs are not in the condition of stop in the vertical operating position, the at least one sensor provides a second signal to the controller.

15. The device according to claim 13, wherein when the stretcher is close to an external edge of the loading ramp in an exiting condition of the stretcher, the at least one sensor provides a first signal to the controller, and when the stretcher is not close to the external edge of the loading ramp in the exiting condition of the stretcher, the at least one sensor provides a second signal to the controller.

16. The device according to claim 2, wherein the driving member and the at least one sensor are electrically connected into a circuit with one another such that if the at least one sensor is open, the driving member is disabled from activating.

17. The device according to claim 16, wherein when the front pivoting legs are in a condition of stop in a vertical operating position, the at least one sensor closes the circuit allowing the driving member to be activated.

18. The device according to claim 16, wherein when the stretcher is close to an external edge of the loading ramp in an exiting condition of the stretcher, the at least one sensor opens the circuit, and when the stretcher is spaced apart from the external edge of the loading ramp in the exiting condition of the stretcher, the at least one sensor closes the circuit.

* * * * *